April 17, 1928.  F. LÖSEL  1,666,627
HIGH PRESSURE TURBINE CASING OR HOUSING
Filed March 9, 1925
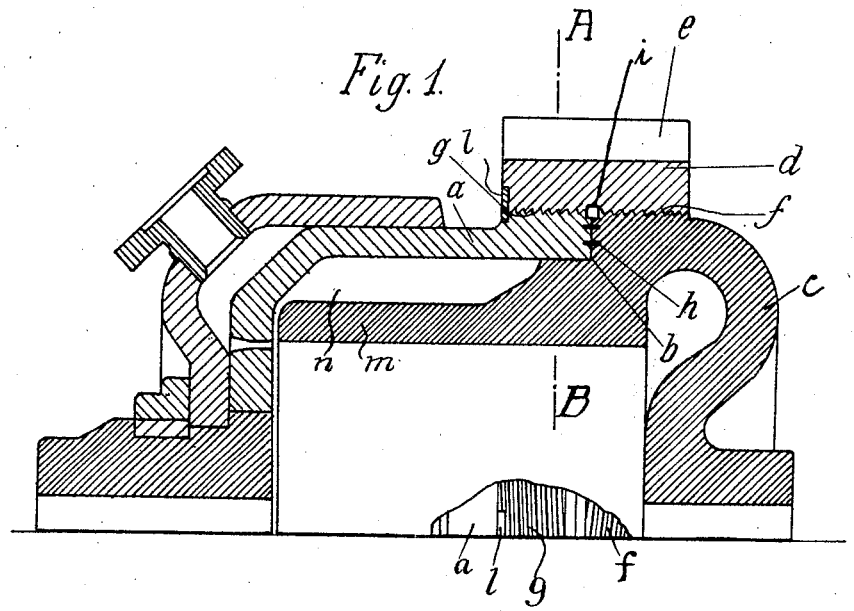
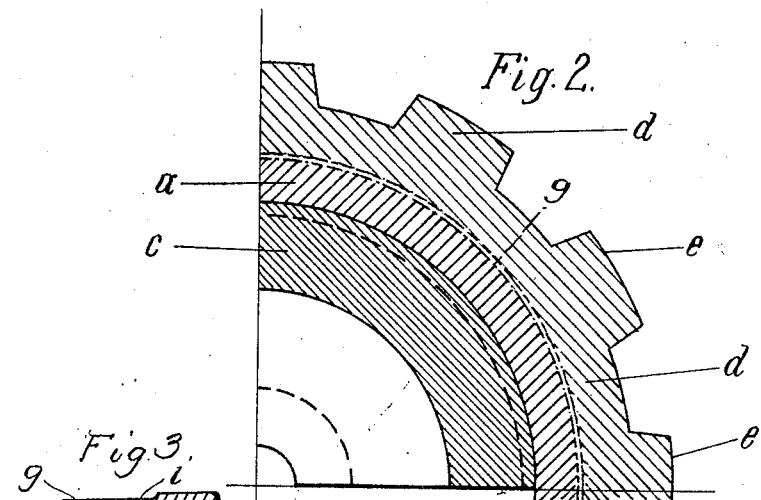
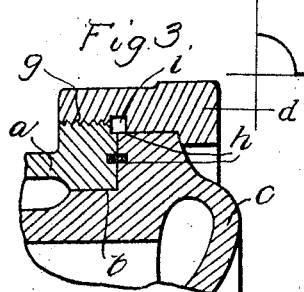
Inventor
Franz Lösel
Marks & Clerk
Attorneys Patented Apr. 17, 1928.

1,666,627

UNITED STATES PATENT OFFICE.

FRANZ LÖSEL, OF BRUNN, CZECHOSLOVAKIA.

HIGH-PRESSURE-TURBINE CASING OR HOUSING.

Application filed March 9, 1925, Serial No. 14,026, and in Austria May 6, 1924.

My invention relates to high pressure turbines and particularly to high-pressure turbine casings or housings.

The main object of the invention is to improve the connection of the high-pressure casing with the lower pressure portion of the turbine housing, and particularly to avoid heavy flanges and bolts, which latter, due to the high pressure, had to be of very heavy construction, although being arranged in several rows.

Another object is to avoid leakages at the connecting joint. The utilization of high pressure steam in turbines made it necessary to devote special attention to the design of the casings and housings for such turbines. The usual casing construction in which longitudinal sections of the casing are connected by longitudinal or axial joints has been found to be unsatisfactory for high pressures, and I now use high pressure casings which are undivided axially or longitudinally at the high pressure end and are connected with the low-pressure part of the turbine casing by an annular joint which may be in a plane vertical to the axis of the turbine, while the lower-pressure part of the turbine casing is preferably axially divided or composed of longitudinal sections. Due to the high fluid pressure, I prefer to make the high pressure casing of wrought iron or similar material of high tensile strength. However, in these high fluid pressure constructions, the connections at the annular joints between the high pressure and low pressure sections of the turbine casing or housing give rise to quite a problem, as the employment of the usual flanges and screw-bolts results in bulky construction, requiring a great number of heavy bolts inserted in several rows of holes, which, besides being expensive, require much time for assembling.

According to this invention, the flanges of the high pressure and lower pressure casing parts and their annular joints are connected by a circumferential coupling member, preferably a sleeve. Such a coupling member or sleeve covers the joint and a part of the circumference of the casings, and keeps the joint tight, whereby heavy flanges, and the great number of heavy bolts generally arranged in several rows for high fluid pressure construction, are entirely omitted. Preferably, the sleeve connects the sections of the casing by means of screw-threads. The sleeve may have one internal continuous screw-thread, but I prefer to make the connection by right-hand and left-hand screw-threads, extending for a certain distance from the joint on the outer surface of the two adjoining parts of the casing, the coupling sleeve having corresponding internal screw-threads, so that when the coupling is screwed upon the joint, the two adjoining faces are drawn closely together and the joint is made tight.

Provision may be made of means at the adjoining surfaces of the joint for making the connection still tighter, and the sleeve may be provided with means to be used in tightening the joint.

In the accompanying drawings:

Fig. 1 shows a longitudinal section through the upper half of a turbine-housing embodying the invention;

Fig. 2 is a quarter-section through section line A—B of Fig. 1;

Figure 3 is a detail sectional view showing another method of holding the casing together.

The high pressure casing $a$, which may be made of wrought iron or material of similar strength, abuts with its annular end wall at the joint $b$ against a corresponding shoulder of the low-pressure part $c$ of the casing, while the outer surfaces of the two adjoining casing sections are on both sides of the joint, and may be flush with each other. These parts of the surfaces may be raised or beaded for the length of the threads to facilitate the cutting of the threads and the attachment of the sleeve. The inner face of the sleeve $d$ is cut correspondingly, and preferably a clearance space or groove $i$ is provided between the two threads $f$ and $g$ of the sleeve. The groove $i$ serves to separate the threads $f$ and $g$ and may in this and in other forms of sleeves accommodate packing to assist in maintaining a tight joint. By turning the screw-sleeve around the joint, the two parts of the casing can be tightly drawn together, the sleeve covering the annular joint, and the screw thread, at the same time, forming a packing. This connection is in itself so strong and tight that other packing may be dispensed with. Light packing rings $h$, preferably of copper, may be arranged between the adjoining surfaces of the joint in grooves cut into the surfaces for this purpose.

To connect or assemble the two parts of the housing by means of the sleeve $d$, the low-pressure casing *c* may be held fast, while the high-pressure part may be drawn towards the low-pressure casing by turning the screw-sleeve, until the connection is close and tight, then a wedge or other kind of lock *l* may be used to secure the sleeve or female screw *d* against accidental loosening. Disassembling may be effected in a similar way.

To facilitate the turning of the sleeve, projections or bosses *e* may be provided as, for example, on the outer surface of the sleeve. In certain cases it may be preferable to equip only one part of the casing and of the sleeve with threads, while other connecting means may be provided on the other casing part, for example as shown in Fig. 3. It may further be advantageous, in certain cases, to provide and connect the different casing parts and the sleeve or coupling not by threads but by other suitable connection means for example, as in Fig. 3. The sleeve or coupling may further be fitted on flange-like raised parts of the casing as in Fig. 3 which may allow the provision of other connecting means besides or in addition to the threads.

The low pressure casing *c* is provided with an annular projection *m* extending into the high pressure casing *a* and forming therewith a space or chamber *n* into which the fluid enters, thus relieving the stress to which the extension *m* is subjected by the high pressure fluid therein.

It will be understood by those skilled in the art that the embodiment of the invention shown in the drawing and above described is only illustrative, and that it is susceptible of various changes without departing from the scope of the invention.

I claim as my invention:

1. In a turbine, the combination of a casing at the higher pressure end, a casing at the low pressure end having an annular joint with the higher pressure casing and having an annular member projecting into the higher pressure casing and forming therewith an annular chamber, and means for coupling said casings together and including a member to cover the joint between the casings and to draw the casings together at said joint.

2. In a turbine, the combination of a casing at the higher pressure end, a casing at the low pressure end having an annular joint with the higher pressure end and having an annular member projecting into the higher pressure casing but spaced inwardly therefrom and leaving a clearance between its end and the admission end of the higher pressure casing, and means for coupling said casings together and including an annular device to cover the joint between the casings and to draw the casings together.

3. Apparatus as in claim 1 wherein the abutting annular surfaces of said casings are provided with annular grooves for the reception of packing means.

4. In a turbine, an axially undivided casing at the high pressure end and an axially divided casing at the low pressure end, said second casing being provided with a shoulder adapted to receive an end of said first mentioned casing to form an annular joint therewith, and means coupling the casings together including an annular member covering said joint and adapted to draw said casings together.

5. An elastic fluid turbine comprising a high pressure casing of high tensile strength, a low pressure casing of a lower tensile strength, said casings having a radial abutting surface and their immediately adjacent circumferences being substantially flush with each other and a sleeve surrounding said casings at their radially abutting parts.

In testimony whereof I affix my signature.

FRANZ LÖSEL.